A. LANG.
CAKE-PAN.
No. 179,031. Patented June 20, 1876.
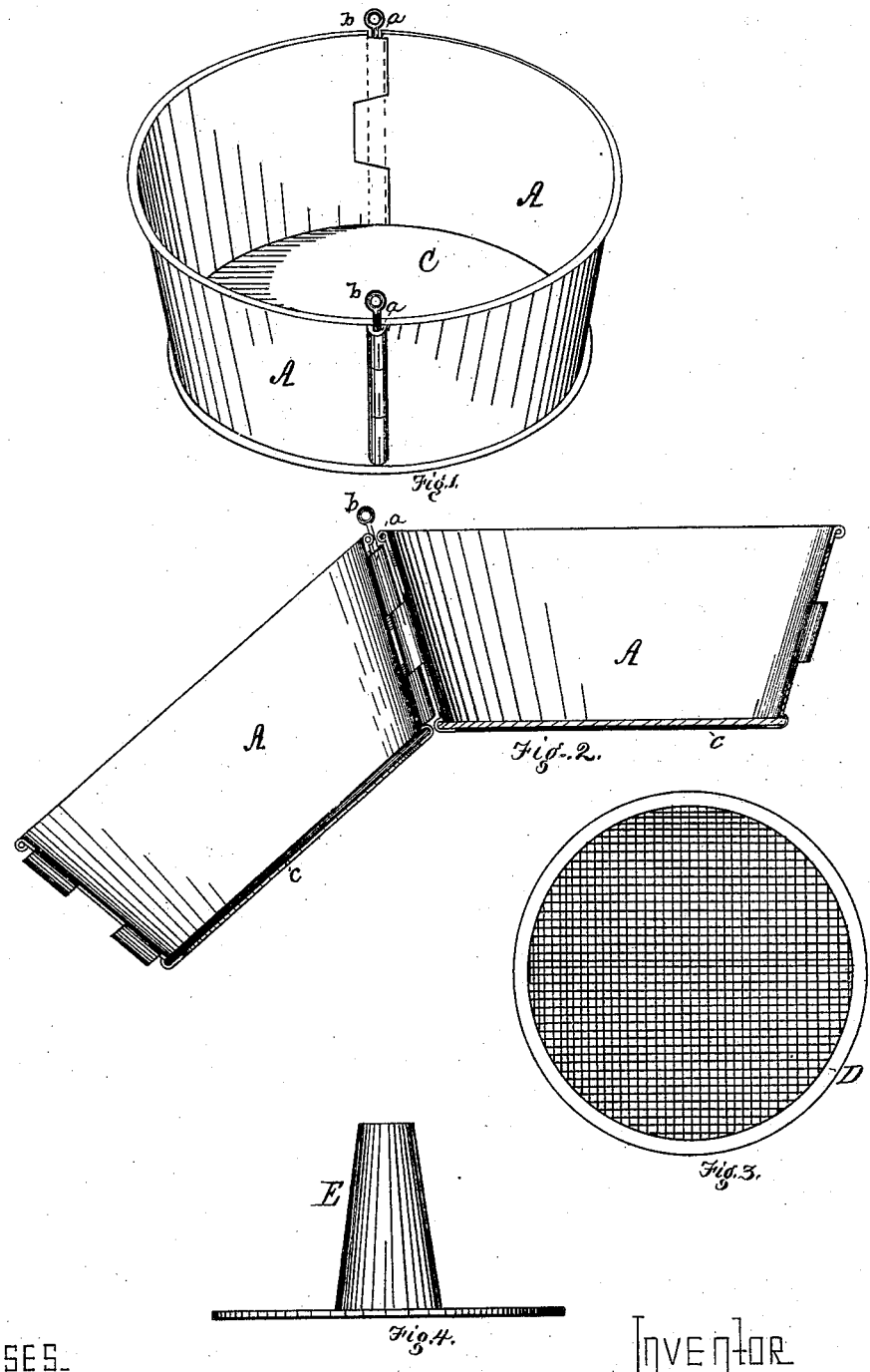
Witnesses
W. A. Conklin
James West
Inventor
Anton Lang
Per O. D. Lewis his atty.

UNITED STATES PATENT OFFICE.

ANTON LANG, OF PITTSBURG, PENNSYLVANIA, ASSIGNOR OF TWO-THIRDS HIS RIGHT TO JOHN SCHMITT AND FRANK HENKEL.

IMPROVEMENT IN CAKE-PANS.

Specification forming part of Letters Patent No. 179,031, dated June 20, 1876; application filed November 1, 1875.

*To all whom it may concern:*

Be it known that I, ANTON LANG, of Pittsburg, in the county of Allegheny and State of Pennsylvania, have invented certain new and useful Improvements in Combined Cake-Pan, Flour-Sifter, and Culinary Funnel; and I do hereby declare the following to be a full, clear, and exact description thereof, sufficient to enable others to make and use the same, reference being had to the accompanying drawings, and to the letters of reference marked thereon, which form a part of this specification.

My invention consists of a pan constructed in two sections, which are hinged together in the rear, to permit of the said sections being opened or closed as occasion may require, the lower rim of said sections being formed with a recess, in which are adapted to be fitted a flour-sifter or culinary funnel, or a bottom for baking cakes, all as will be hereinafter more fully described.

Referring to the drawings, Figure 1 is a perspective view of my invention as adapted for baking purposes. Fig. 2 is a similar view, with the sections thrown open. Fig. 3 is a plan view of the flour-sieve; and Fig. 4 is a side elevation of the culinary funnel.

Similar letters of reference occurring on the several figures indicate like parts.

A represents the sections of the utensil, which are hinged or pivoted together at the rear and front, as shown at $a$ $b$, Figs. 1 and 2, and provided at the bottom with a groove, $c$, extending around the entire circumference of the sections. Within this groove $c$ is adapted to be fitted the sieve D, when it may be desired to sift flour or strain jelly; the culinary funnel E may also be fitted therein when it is required for use, and when it is to be used for baking purposes the funnel-shaped bottom may be reversed in the groove $c$, thereby adapting it for baking cake; or a plain bottom may be fitted in for other purposes.

The operation is such that the rod $b$ may be withdrawn from the hinge $a$, thereby allowing the sections to open to permit of the adjustment of the separate devices, the sections being locked together when they are in place, as will be readily understood.

The advantages of my invention will be readily seen, inasmuch as it combines several very necessary and useful articles of almost daily use in one and the same utensil.

Having thus described my invention, what I claim as new, and desire to secure, is—

The combination of the sieve D and culinary funnel E with the hinged sections A, the several parts being arranged to operate substantially as and for the purpose described.

ANTON LANG.

Witnesses:
JAMES H. PORTE,
JAMES WEST.